United States Patent
Tyll et al.

(10) Patent No.: US 7,051,659 B2
(45) Date of Patent: May 30, 2006

(54) PROJECTILE STRUCTURE

(75) Inventors: Jason S. Tyll, Blue Point, NY (US); Robert J. Bakos, Wading River, NY (US); Florin Girlea, Flushing, NY (US); Ralph Woelfel, Sayville, NY (US); Dean Modroukas, Yonkers, NY (US); John I. Endos, East Hampton, NY (US)

(73) Assignee: Alliant Techsystems Inc., Edina, MN (US)

( * ) Notice: Subject to any disclaimer, the term of this patent is extended or adjusted under 35 U.S.C. 154(b) by 223 days.

(21) Appl. No.: 10/164,718

(22) Filed: Jun. 10, 2002

(65) Prior Publication Data

US 2003/0051536 A1 Mar. 20, 2003

Related U.S. Application Data

(60) Provisional application No. 60/311,367, filed on Aug. 13, 2001.

(51) Int. Cl.
*F42B 15/00* (2006.01)
*F02K 7/14* (2006.01)

(52) U.S. Cl. .................. 102/374; 102/381; 60/768; 60/269

(58) Field of Classification Search ............... 102/374, 102/381, 503, 520; 60/720, 767, 768, 269, 60/204
See application file for complete search history.

(56) References Cited

U.S. PATENT DOCUMENTS

| 2,772,620 | A | * | 12/1956 | Ferri | 454/76 |
| 3,363,421 | A | * | 1/1968 | Ferri | 60/263 |
| 3,974,648 | A | * | 8/1976 | Kepler | 60/204 |
| 4,291,533 | A | * | 9/1981 | Dugger et al. | 60/240 |
| 4,539,911 | A | * | 9/1985 | Flatau | 102/374 |
| 4,896,502 | A | * | 1/1990 | Ravel et al. | 60/767 |
| 5,067,406 | A | | 11/1991 | Olson et al. | |
| 5,214,914 | A | * | 6/1993 | Billig et al. | 60/204 |
| 5,485,787 | A | | 1/1996 | Bowcutt et al. | |
| 5,513,571 | A | | 5/1996 | Grantz et al. | |
| 5,544,586 | A | * | 8/1996 | Huerta | 102/374 |
| 5,853,143 | A | | 12/1998 | Bradley et al. | |
| 6,293,091 | B1 | | 9/2001 | Seymour et al. | |
| 6,536,350 | B1 | * | 3/2003 | Cartland et al. | 102/374 |
| 2002/0124758 | A1 | | 9/2002 | Cartland et al. | |

\* cited by examiner

*Primary Examiner*—Michael J. Carone
*Assistant Examiner*—James S. Bergin
(74) *Attorney, Agent, or Firm*—TraskBritt

(57) ABSTRACT

A scramjet has a cowl, a center structure, and a plurality of wide pylons connecting the cowl to the center structure, with scramjet engines positioned between adjacent pylons. Leading surfaces of adjacent pylons converge to one another to provide side wall compression to air entering the engines. The center structure includes a fore body, a center body and an aft body that, with the pylons, define a basic structure either formed entirely from one piece or several securely connected pieces. A method of testing the scramjet projectile comprises using a gun to accelerate the scramjet projectile to the takeover velocity of the engines.

24 Claims, 4 Drawing Sheets

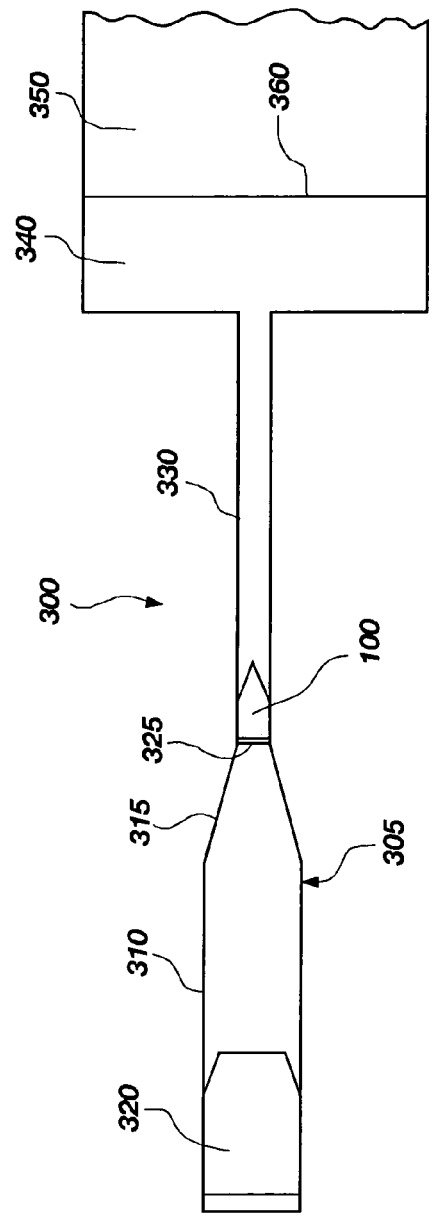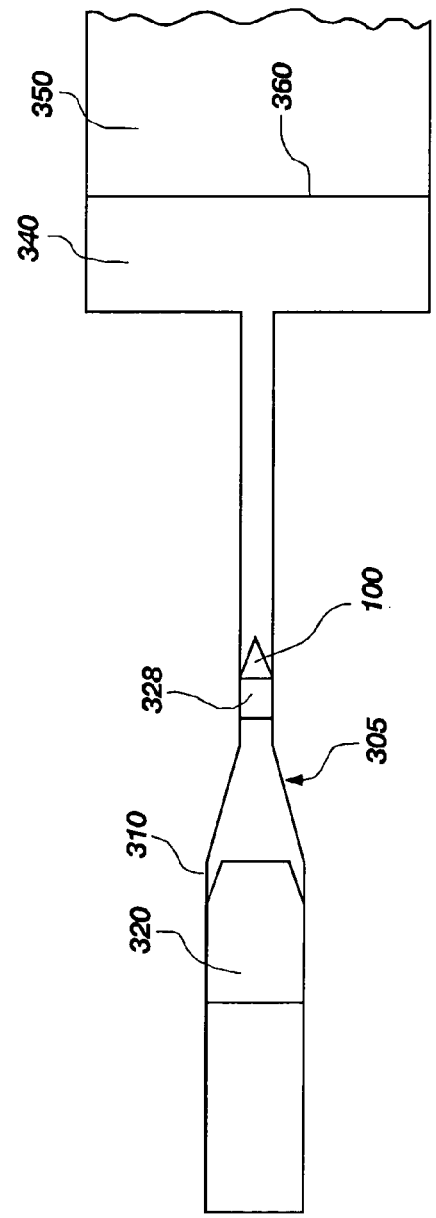

PROJECTILE STRUCTURE

PRIORITY CLAIM

This application claims the benefit of U.S. Provisional Application Ser. No. 60/311,367, filed Aug. 13, 2001, and entitled "METHOD AND APPARATUS FOR TESTING ENGINES."

GOVERNMENT INTEREST

This invention was developed in part under a Phase II Small Business Innovation Research Contract.

BACKGROUND OF THE INVENTION

1. Field of the Invention

Embodiments of the invention relate to high velocity engines and projectiles. More particularly, embodiments of the invention relate to testing procedures and apparatuses for high velocity engines and projectiles.

2. Description of Related Art

Ramjet and supersonic combustion ramjet (scramjet) technology has been the subject of extensive research and development. In this application, the term ramjet is intended to include scramjets, where appropriate. Scramjet engines provide propulsion at hypersonic speeds (i.e., above Mach 5) by capturing atmospheric air to burn onboard fuel. For hypersonic propulsion, these air breathing engines are more efficient than rocket motors and can allow longer duration hypersonic flight with greater payload.

Testing scramjet engines has, in the past, been an extremely expensive undertaking. This is due to the need to accelerate a scramjet to its takeover velocity, the velocity at which the engine begins to be able to operate. The takeover velocity is at supersonic or hypersonic speeds. One mainstream thought regarding methods of accelerating a scramjet engine to the takeover velocity involves a first stage vehicle being lifted to flight level by a jet aircraft and released. The first stage vehicle then accelerates the scramjet vehicle beyond the takeover velocity, at which point the scramjet engine ignites and testing can begin. The costs associated with one such test can be on the order of magnitude of $10 million. The high cost of such testing has proved to be prohibitive in many cases, resulting in insufficient testing of scramjet technology.

As a low cost alternative, it has been proposed to use a gas gun to accelerate to supersonic speeds a projectile having a scramjet engine. Many problems exist with the prior art ramjet test projectile and with methods for launching such a ramjet test projectile from a gas gun. For example, the acceleration forces to which a ramjet, and particularly a scramjet, projectile are subjected during a gas gun launch is more than 5000 G's and is more typically on the order of 10,000 G's, that is, 10,000 times the force of gravity, or more. Launches from other types of guns can subject a scramjet or other projectile to 60,000 or 70,000 G's. At accelerations as high as these, the projectile must be G-hardened to withstand the loads resulting from the acceleration. Conventional mechanical fasteners often used in the prior art cannot withstand such forces. Moreover, the basic structural design of prior art ramjet projectiles is incapable of withstanding such forces. Prior ramjet test projectiles typically include a heavy center body surrounded by a cowl. Thin pylons are used to hold the center body and cowl together. When a projectile having such a construction is subjected to the high acceleration forces present during gun launch, the thin pylons break and the test projectile disintegrates.

SUMMARY OF THE INVENTION

A projectile structure is provided. In an exemplary embodiment, the projectile structure comprises a cowl and a center structure. A plurality of wide pylons connects the cowl to the center structure. At least one engine is provided, the engine being located between adjacent pylons. The cowl, the center structure and the plurality of pylons form an integral structure. The pylons define, in part, the inlet to the engine, providing side wall compression to a fluid provided to the engine.

Embodiments of the invention greatly increase the feasibility of ramjet, and particularly scramjet, technology, research and development. By using a gas gun to launch a scramjet projectile, embodiments of the invention reduce the launch cost of a scramjet projectile by two orders of magnitude compared to aircraft-released and/or rocket acceleration.

Exemplary embodiments of the present invention overcome the problems in the prior art. Embodiments of the invention use strong materials, such as titanium, for the projectile. The scramjets of the invention have a basic structure formed from a single piece or constructed from a small number of parts connected securely, such as by welding or threaded connections. For example, particular embodiments of the invention are constructed from four titanium parts welded together.

Exemplary embodiments of the present invention utilize wide pylons as structural members of the projectile. The use of wide pylons as structural members is enabled by also using the pylons to form part of the scramjet engine inlet. Otherwise, wide pylons would adversely affect engine performance. When used as part of the scramjet engine inlets, the pylons provide tangential compression to the inlet airflow. The arrangement of the pylons at the inlet, along with a tapered fore body, provides a radial and tangential flow to incoming air, that is, flow of air radially outward from the longitudinal axis of the scramjet and in directions tangential to the scramjet. Thus, the arrangement of the pylons in the scramjet according to the present invention provides a three-dimensional air flow. The three-dimensional air flow leads to improved scramjet performance compared to the two-dimensional air flow achieved by the high aspect ratio slit used for the inlet flow area in the prior art. Thus, the structure and design of the pylons in the present invention provide structural integrity to the test projectile, as well as improved scramjet engine performance.

BRIEF DESCRIPTION OF THE DRAWINGS

FIGS. 5–8 are schematic views of an example of a testing apparatus of the invention.

DETAILED DESCRIPTION OF THE PREFERRED EMBODIMENTS

Figure 1:
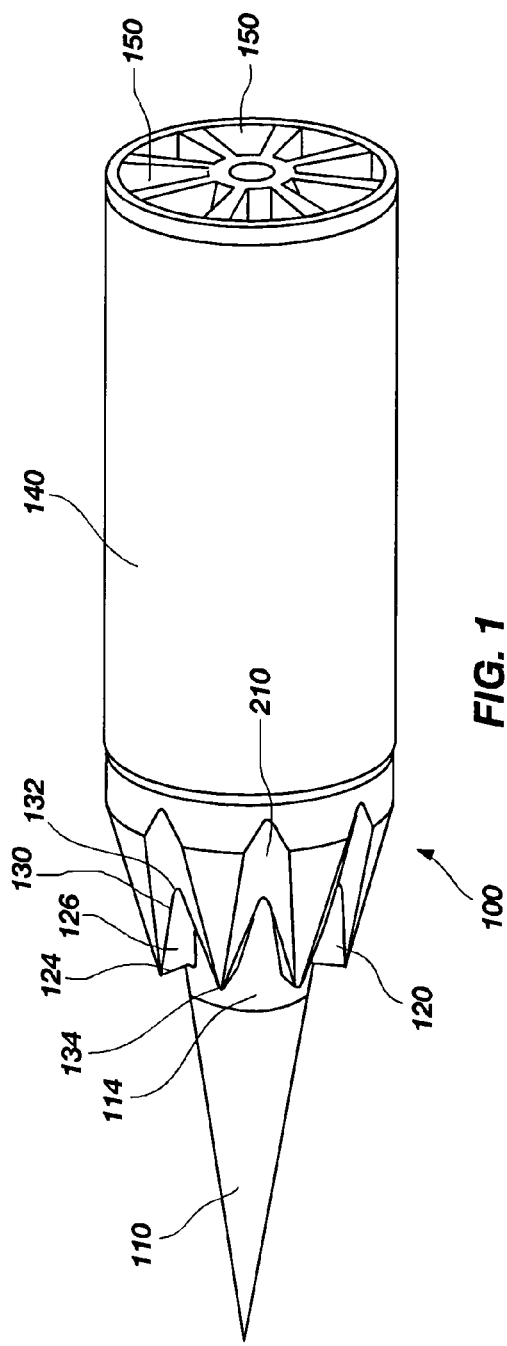
FIG. 1 is a perspective view of a projectile structure in accordance with embodiments of the invention.

FIGS. 1–4 show an example of a scramjet projectile in accordance with an embodiment of the invention. As can be seen from FIGS. 1 and 2, a projectile structure 100 has primary structural members including a conical fore body 110, a center body 114, an aft body 125, together defining a center structure, and an annular member or cowl 140. The conical fore body 110 is connected to the center body 114. The conical fore body 110 includes an external surface 115 extending from its tip towards the cowl 140. The external surface 115 is configured to compress the fluid (air) through which the projectile passes. The aft body 125 is connected to the center body 114 at an end opposite the conical fore body 110. A plurality of pylons 120 extend radially from the center body 114 and aft body 125 to the cowl 140. The pylons serve to segregate adjacent internal flow passages 200, each of which is part of a respective scramjet engine. The cowl 140 encloses the scramjet engines. In this example, each pylon 120 has a leading edge 124, two side surfaces 126 and an aft end adjacent to the aft end of the projectile structure 100. The flow passages 200 are each defined by side surfaces 126 of adjacent pylons 120, center body 114, aft body 125, and cowl 140. Although described herein as separate members connected together by, for example, welding or threaded connections, the conical fore body 110, the center body 114, the aft body 125 and the pylons 120, or combinations thereof, can be formed as a monolith, that is, a single piece, for example, by casting or by machining a billet.

Figure 2:
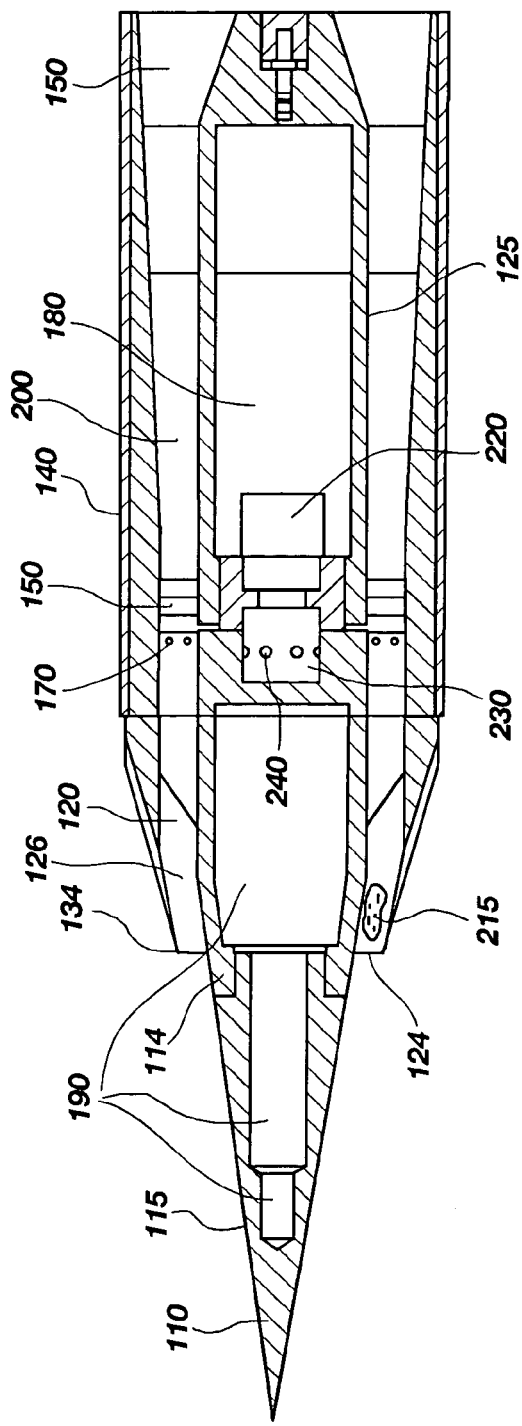
FIG. 2 is a sectional view of an embodiment of the invention shown in FIG. 1.
Figure 3:
FIG. 3 is a front view of the embodiment of the invention shown in FIG. 2.

Two flow passages 200 are shown in cross-section in FIG. 2. The flow passages 200 extend longitudinally through the projectile. Inlets to flow passages 200 are each defined by leading portions of side surfaces 126 of adjacent pylons 120 and by center body 114. The inlets are preferably not enclosed by the cowl 140. As shown in FIG. 3, leading portions of side surfaces 126 of adjacent pylons 120 are arranged opposite each other to define the inlets to flow passages 200. The side surfaces 126 of the pylons 120 are arranged to converge forwardly toward opposing side surfaces 126 of adjacent pylons and thereby provide sidewall compression to the air entering the inlets. Accordingly, the air entering the inlets of flow passages 200 is compressed by the external surface 115 of the conical fore body 110 and also by leading portions of the side surfaces 126 of the pylons 120. Preferably, the external surface 115 of the conical fore body 110 and leading portions of the side surfaces 126 are configured to have certain angles to compress and turn the air as it enters the inlets, thus, raising the pressure of the air flow.

In the illustrated embodiment, the pylons 120 and the leading edge 124 of cowl 140 define notches 130 at the inlets. The notches 130 here are V-shaped and have leading points 134, at the leading edges 124 of the pylons 120, and rear points 132. The notches 130 may have other shapes, for example, U-shape, elliptical or hyperbolic, but are usually generally scalloped in shape. The objective of the shape of the leading edge of the cowl 140 is to achieve a shock wave at the rear points 132 for the design Mach number, and allow a self-starting inlet. The leading edge of the cowl 140 is arranged to intersect a conical shock wave set up by the conical fore body 110. The shapes of the notches 130 are designed such that the leading edge of the cowl 140 also conforms to planar shock waves set up by the leading portions of the side surfaces 126 of the pylons 120. These provisions maximize the performance of the engines. Each notch 130 is the leading edge of an exterior surface 210. Although exterior surfaces 210 are shown as having both concave and convex surfaces, other shapes for exterior surfaces 210 are also appropriate.

Utilizing the pylons 120 to compress the incoming air flow allows the pylons to be made wider than in prior art scramjet projectiles. In previous projectile structures, wide pylons would have inhibited air flow into the scramjet engines and affected the performance of the engines. However, by using the pylons to compress the air entering the engines in accordance with the present invention, it is possible to have wide pylons that provide structural integrity to the projectile. For example, a profile width of the pylons 120, the width between adjacent flow passages at the throat of the flow passages, can be made as great as and even greater than a profile width of the engines, the width of the flow passages 200 between adjacent pylons 120 being from 1 to 12 times as great, preferably 2 to 5 times as great. These relative widths, as described, are taken at the throat, the minimum flow area of the flow passages 200. Pylons having such thicknesses provide the structural integrity needed for the test projectile to withstand the high acceleration forces, G forces, generated during gas gun launch. The key is to have wide pylons to give structural integrity while at the same time using those wide pylons constructively to yield high engine performance.

Figure 9:
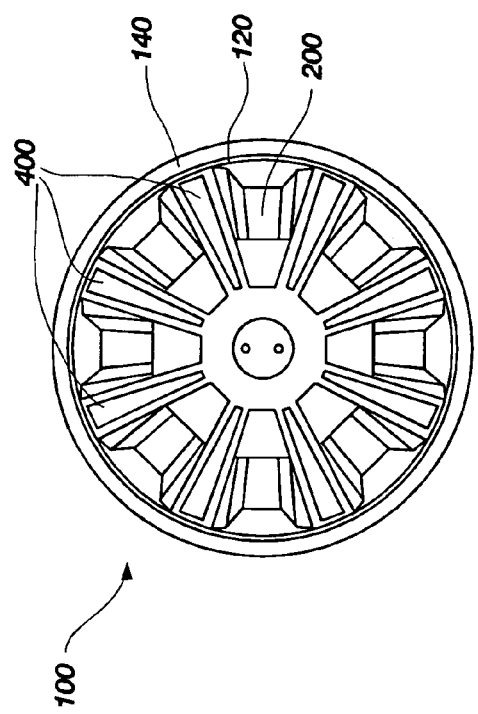
FIG. 9 is a rear view of another embodiment of the invention.
Figure 4:
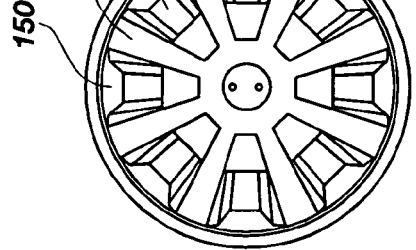
FIG. 4 is a rear view of the embodiment of the invention shown in FIG. 2.

FIG. 3 is a frontal view of the projectile structure 100 shown in FIGS. 1 and 2. FIG. 4 is a rear view of the projectile structure 100 shown in FIGS. 1 and 2. As can be seen from FIGS. 1, 3 and 4, the illustrated embodiment has eight pylons 120 and eight flow passages 200. As can be seen from FIGS. 3 and 4, the thickness of the pylons 120 in a circumferential direction about the center line of the projectile structure 100 is preferably greater than the width of the flow passages 200 along the same direction. As discussed further below, in alternate embodiments, this relatively large volume of the pylons 120, can be used, in part, for additional storage. For example, if the pylons 120 are made hollow adjacent leading edges 124, these volumes can be used to store fuel or munitions, including explosives 215, or boosters 400 (FIG. 9).

As can be seen in FIGS. 2 and 4, each flow passage 200 has at its rearmost portion a nozzle 150. In addition, each flow passage 200 has a flame holder 160 and fuel supply ports 170. Primary storage area 180 is provided in aft body 125. Fuel can be stored in primary storage area 180 and supplied to each of the flow passages 200 by fuel valve 220 and fuel system 230. Fuel valve 220 may be an inertially activated valve of a known type that is triggered by high G forces to allow fuel to flow. The fuel can be a compressed or liquefied gas or a solid fuel. In this example, fuel system 230 supplies fuel through apertures 240 and passages (not shown) through the center body 114 and the pylons 120 to fuel supply ports 170 in the pylons. The throat of each flow passage 200 is preferably located upstream of the point at which fuel is introduced into the flow passage 200. Also shown in FIG. 2 is a secondary storage volume 190, which can store, for example, additional fuel, navigational or communications instrumentation, or munitions.

In operation, air is compressed, turned and introduced to flow passages 200. As discussed above, the pylons 120 are arranged to provide side wall compression. The turning of the air is performed by the pylons 120 and conical fore body 110, with the pylons 120 preferably providing about two-thirds of the turning and the conical fore body 110 providing the remaining one-third. The external surface 115 of the conical fore body 110 can have an angle, from the longitudinal axis to the surface, of, for example, about 8 degrees to perform compression and turning of the air.

The temperature of the air rises due to the heat of compression. As the compressed air passes fuel supply ports 170, fuel is introduced by fuel supply ports 170 and ignited, for example, by spontaneous combustion due to compression or by other ignition. As the burning air/fuel mixture progresses along flow passages 200, it expands and exits projectile structure 100 through nozzles 150, thereby creating thrust to move the projectile forward. In the illustrated embodiment, each flow passage 200 is an independent scramjet engine. The fuel supply ports 170 of all of the flow passages 200 can be controlled together so that, when fuel flows, it flows to all of the flow passages 200 simultaneously. Thus, the outputs of all of the engines can be controlled together. In preferred embodiments, the fuel supply ports 170 of each flow passage 200 are independently controlled so that the amount of thrust generated by each flow passage 200 is controllable independently of the thrust of other flow passages 200. As a result, the output of each engine is controllable independently, and the projectile structure 100 can be steered during flight by independently controlling the amount of fuel supplied to each flow passage 200.

FIGS. 5–8 illustrate an example of a testing apparatus 300 used to economically test ramjet and scramjet technology. The testing apparatus 300 is able to simulate flight and operation of the scramjet test projectile at altitude. A two-stage gas gun 305 employing a light gas may be used as the testing apparatus 300. The gas gun 305 is used to accelerate the test projectile to supersonic speeds necessary to test the scramjet engines. The gas gun 305 has a pump tube 310 in which a piston 320 is arranged. The piston 320 moves in the longitudinal direction of pump tube 310. A gun barrel 330 is connected to pump tube 310 by a transitional section 315. Transitional section 315 transitions between the cross-sectional area of pump tube 310 and the smaller cross-sectional area of gun barrel 330. The gun barrel has, for example, a diameter of about 4–8 inches and a length of about 80–130 feet.

Gun barrel 330 is connected to a blast tank 340, which is, in turn, connected to a range tank 350. A membrane 360 separates blast tank 340 and range tank 350. When the gas gun 305 is fired, the air in the gas gun 305 gets extremely hot. An inert gas should be provided in blast tank 340 to prevent any unwanted combustion during the firing of the gun. The air pressure in range tank 350 is reduced to simulate flight at altitude, for example, about 100,000 feet. Membrane 360 may include a fast acting valve that opens to allow the test projectile to pass through, then closes quickly to maintain the separation between blast tank 340 and range tank 350.

Figure 7:
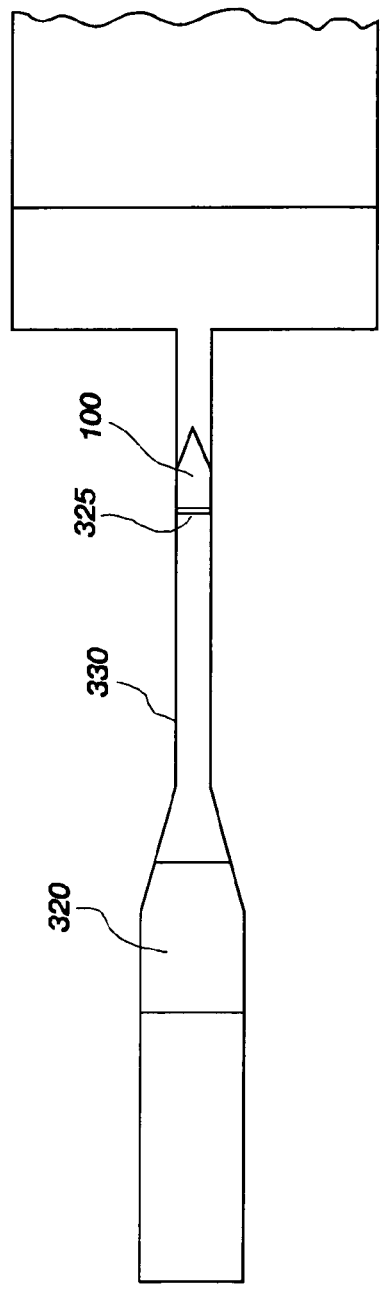
Figure 8:
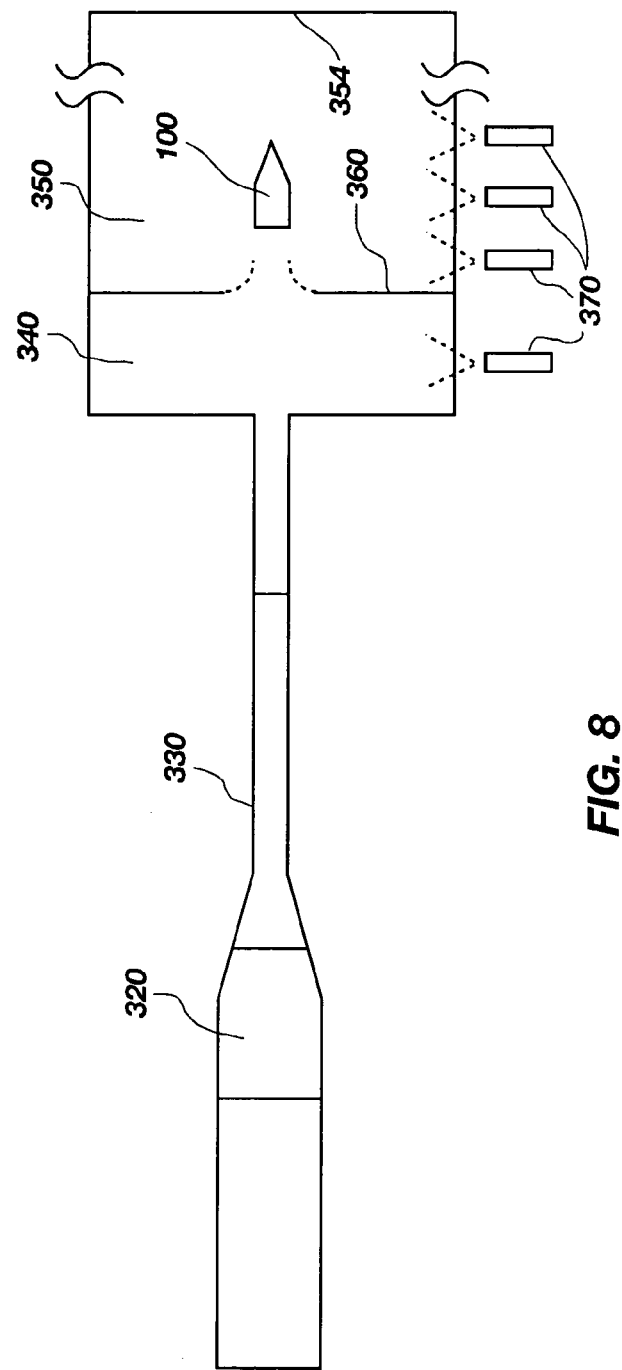

In operation, the projectile structure 100 to be tested is arranged in gun barrel 330. Piston 320 is accelerated to the right in FIG. 5 to compress a light gas in pump tube 310. Examples of the gas that can be used in pump tube 310 are hydrogen and helium. Piston 320 can be accelerated by, for example, a gunpowder explosion behind piston 320 (to the left of piston 320 in FIG. 5) or any other appropriate means. FIG. 6 shows piston 320 being moved toward the right and compressing the gas in pump tube 310. Projectile structure 100 begins to move to the right under the force created by the compressed gas in pump tube 310. The test projectile may have a full bore structure. Therefore, some means of preventing the light gas from passing through the flow passages 200 of projectile structure 100 is preferably used. For example, a pusher plate 325 can be used behind projectile structure 100 between projectile structure 100 and the light gas. Alternatively, some means of protecting the rear and/or sides of projectile structure 100 (and possibly gun barrel 330) can be used. An example of such protection is a sabot 328, shown in FIG. 6. Sabots also provide a means to distribute the launch load onto a larger area of projectile structure 100. The pusher plate 325 or the sabot 328, whichever is used, separates from the projectile structure 100 at some point after the projectile structure 100 exits the gun barrel 330. FIG. 7 shows piston 320 at its rightmost position and projectile structure 100 moving toward the right in gun barrel 330. Projectile structure 100 is preferably accelerated to takeover velocity in gun barrel 330. Projectile structure 100 then exits gun barrel 330 and proceeds through blast tank 340 and down range tank 350. FIG. 8 shows projectile structure 100 piercing membrane 360 after exiting gun barrel 330.

Instrumentation 370 is provided to detect and record the position of projectile structure 100 versus time during its flight through blast tank 340 and range tank 350. The instrumentation 370 can include x-ray stations to determine not only position vs. time, but also the structural integrity of the projectile. The instrumentation 370 can also include photo stations for taking laser-illuminated digital photographs of the projectile; infrared stations to take infrared images of the exhausts of the engines, to determine engine efficiency; stations for ultraviolet imaging and shadowgraphs; and high speed video cameras, such as those produced under the trademark HYCAM. Projectile structure 100 may also be provided with instrumentation. The instrumentation included with projectile structure 100 can include RF transmitting/receiving capability in order to provide from the test projectile information concerning pressure, temperature, acceleration, etc. Both the instrumentation 370 and the instrumentation of the projectile structure 100 record information about the performance of the projectile and its engines. The flight of projectile structure 100 is concluded as it impacts end wall 354 of range tank 350.

Although the method of testing according to the present invention has been described in connection with a gas gun employing a light gas, it is understood that the method is applicable to other guns, such as large military guns.

As mentioned above, the relative thickness of pylons 120 in preferred embodiments of the invention provide space that can be used to store, for example, fuel, munitions, instrumentation, booster engines or other appropriate material. As discussed above, ramjet and scramjet engines must reach a takeover velocity (usually Mach 2 or greater) before they will operate. In certain embodiments of the invention, pylons 120 can be made hollow in order to allow placement of a booster, for example a solid or other rocket booster, that can be used to accelerate the ramjet or scramjet engine up to the takeover velocity. A booster can be provided in each pylon or only in selected pylons. For example, if the projectile structure 100 has eight pylons, any number from one to eight boosters may be used. However, it is preferable to space the boosters symmetrically so as to more easily create symmetrical thrust. FIG. 9 shows a rear view of a projectile structure 100 using a rocket booster 400 in each of eight pylons.

While the invention has been described with reference to particular embodiments and examples, those skilled in the art will appreciate that various modifications may be made thereto without significantly departing from the spirit and scope of the invention.

What is claimed is:

1. A projectile structure, comprising:
   an annular member;
   a center structure;
   a plurality of pylons comprising side surfaces and connecting the annular member to the center structure, the plurality of pylons being spaced circumferentially from one another around the center structure by flow passages therebetween; and
   at least one engine comprising one of the flow passages having an inlet and positioned between side surfaces of two adjacent pylons of the plurality of pylons;
   wherein at least a portion of each of the side surfaces of the two adjacent pylons is arranged to compress and to turn air entering the inlet of the flow passage, wherein the flow passage of the at least one engine defines a throat at a minimum transverse cross-sectional area thereof, wherein each of the plurality of pylons has a profile width defined as a width of a pylon between adjacent flow passages at throats of the adjacent flow passages, wherein the profile width of each of the plurality of pylons at the throat thereof is from 2 to 5 times a profile width of the at least one engine at the throat thereof, wherein the profile width of the at least one engine is defined as a width of the flow passage between the two adjacent pylons at the throat.

2. The projectile structure of claim 1, wherein the at least one engine comprises a plurality of engines.

3. The projectile structure of claim 2, wherein each of the plurality of engines has an output, and the outputs of all of the plurality of engines are controllable together.

4. The projectile structure of claim 2, wherein each of the plurality of engines has an output, and the output of a first of the plurality of engines is controllable independently from the output of a second of the plurality of engines.

5. The projectile structure of claim 4, wherein the output of each of the plurality of engines is controllable independently from the output of each of the other engines.

6. The projectile structure of claim 2, wherein the annular member comprises a cowl having a notched leading edge, the notched leading edge having a plurality of forward points, and a plurality of rearward points, wherein one of the plurality of forward points corresponds to each of the plurality of pylons, and one of the plurality of rearward points is positioned over each of the flow passages.

7. The projectile of claim 6, wherein the notched leading edge is shaped to cause a leading edge of the cowl to conform to planar shock waves set up by air flow contacting leading portions of the side surfaces of the pylons.

8. The projectile of claim 7, wherein the notched leading edge is of one of a V-shape, a U-shape, an elliptical shape and a hyperbolic shape.

9. The projectile structure of claim 2, further comprising a plurality of boosters, wherein each of the boosters is located within an aft portion of a respective one of the plurality of pylons.

10. The projectile of claim 2, wherein the profile widths are measured in a circumferential direction about a longitudinal axis of the projectile structure.

11. The projectile structure of claim 1, wherein the at least one engine is a scramjet engine.

12. The projectile structure of claim 1, wherein the inlet is defined in part by the two adjacent pylons between which the at least one engine is positioned.

13. The projectile structure of claim 12, wherein the projectile structure has a fore and an aft, and the inlet is defined in part by side surfaces of the adjacent pylons, the side surfaces converging toward one another from fore to aft.

14. The projectile structure of claim 13, wherein the center structure includes a tapered fore body to compress and to turn air entering the inlet, the inlet being defined in part by the tapered fore body.

15. The projectile of claim 14, wherein the annular member comprises a cowl and the leading edge of the cowl is arranged to intersect a conical shock wave set up by air flowing over the tapered forebody.

16. The projectile of claim 14, wherein the tapered forebody has an exterior surface at an angle of about eight degrees to a longitudinal axis of the projectile structure.

17. The projectile structure of claim 1, wherein the center structure and the plurality of pylons are formed of one piece.

18. The projectile structure of claim 1, wherein the annular member, the center structure, and the plurality of pylons comprise individually formed parts connected to one another by one of welding and threaded connections to define a basic structure having an engine.

19. The projectile structure of claim 18, wherein the basic structure comprises titanium.

20. The projectile structure of claim 1, wherein at least a portion of at least one pylon is hollow.

21. The projectile structure of claim 20, wherein the hollow portion comprises a fuel storage area.

22. The projectile structure of claim 20, wherein the hollow portion comprises a munitions storage area.

23. The projectile of claim 1, wherein a leading portion of each of the side surfaces is configured to compress and to turn the air entering the inlet.

24. The projectile of claim 1, wherein the profile widths are measured in a circumferential direction about a longitudinal axis of the projectile structure.

* * * * *

UNITED STATES PATENT AND TRADEMARK OFFICE
CERTIFICATE OF CORRECTION

PATENT NO. : 7,051,659 B2 Page 1 of 1
APPLICATION NO. : 10/164718
DATED : May 30, 2006
INVENTOR(S) : Jason S. Tyll et al.

It is certified that error appears in the above-identified patent and that said Letters Patent is hereby corrected as shown below:

On the title page:
In the section (75) Inventors,
      6$^{th}$ line:          change "John I. Endos," to --John I. Erdos,--

Signed and Sealed this

Twenty-fourth Day of July, 2007

JON W. DUDAS
*Director of the United States Patent and Trademark Office*